United States Patent [19]
Allen et al.

[11] Patent Number: 5,424,623
[45] Date of Patent: Jun. 13, 1995

[54] COORDINATED CONTROL FOR A WORK IMPLEMENT

[75] Inventors: William E. Allen, Peoria, Ill.; Paul D. Anderson, Kent, Wash.; Walter J. Bradbury, Peoria, Ill.; John M. Hadank, Dunlap, Ill.; Richard B. League, Peoria, Ill.

[73] Assignee: Caterpillar Inc., Peoria, Ill.

[21] Appl. No.: 60,667

[22] Filed: May 13, 1993

[51] Int. Cl.$^6$ ................................................ E02F 3/32
[52] U.S. Cl. .......................... 318/568.18; 318/568.19; 74/471 XY; 180/324; 414/695.5
[58] Field of Search ...................... 318/568.11, 568.16, 318/568.17, 568.18, 568.2, 590, 568.19; 74/471 XY; 91/358 R, 359, 361, 508, 513; 180/324; 364/424.07; 414/694, 695, 695.5, 695.8, 699

[56] References Cited

U.S. PATENT DOCUMENTS

| | | | |
|---|---|---|---|
| 4,377,043 | 3/1983 | Inui et al. | |
| 4,844,685 | 7/1989 | Sagaser | |
| 4,910,662 | 3/1990 | Heiser et al. | |
| 5,002,454 | 3/1991 | Hadank et al. | 414/695.5 |
| 5,065,326 | 11/1991 | Sahm | 364/424.07 |
| 5,160,239 | 11/1992 | Allen et al. | 414/699 |

FOREIGN PATENT DOCUMENTS

| | | |
|---|---|---|
| 0293057 | 11/1988 | European Pat. Off. |
| 0361666 | 4/1990 | European Pat. Off. |

OTHER PUBLICATIONS

Patent Abstracts of Japan vol. 10 No. 191 (M-495) 4 Jul. 1986 & JP,A,61 036 426 (Itachi Construc. Mach. Co. Ltd.)
Patent Abstracts of Japan vol. 7 No. 291 (M-265) 27 Dec. 1983 & JP,A,58 164 829 (Hitachi Kenki).
Patent Abstracts of Japan vol. 9 No. 158 (M-393) 3 Jul. 1985 & JP,A,60 033 940 (Hitachi Kenki).

*Primary Examiner*—Bentsu Ro
*Attorney, Agent, or Firm*—James R. Yee

[57] ABSTRACT

The present invention provides, an apparatus for controllably moving a vehicle's work implement. The work implement includes a first appendage pivotally connected to the vehicle, and a second appendage pivotally connected to the first appendage. The apparatus senses the geometry of the work implement and responsibly producing a plurality of position signal and produces one of a manual control mode signal and an automatic control mode signal. An operator interface produces first and second lever command signals indicative of desired movement of the work implement. The apparatus receives the one control mode signal and the first and second lever control signals and responsively produces linear motion of the end point of the second appendage along first and second work axes if the one control mode signal is equal to the automatic control mode signal.

7 Claims, 8 Drawing Sheets

COORDINATED CONTROL FOR A WORK IMPLEMENT

TECHNICAL FIELD

This invention relates generally to a control system for controlling a work implement on a work vehicle, and more particularly to a control system which provides a coordinated control interface between the work implement and the vehicle operator.

BACKGROUND ART

In the field of work vehicles, particularly those vehicles which perform digging or loading functions such as excavators, backhoe loaders, and front shovels, a work implement is generally controlled by a manual control system having two or more operator control levers, and additionally, other vehicle control devices. Typically, the manual control system often includes foot pedals as well as hand operated levers. A backhoe manufactured by J. I. Case Manufacturing Co., for example, employs three levers and two pedals to control the work implement. A backhoe manufactured by Ford Motor Co. utilizes four control levers. There are drawbacks associated with these implement control schemes. One is operator stress and fatigue resulting from having to manipulate so many levers and pedals. Further, a vehicle operator is required to possess a relatively high degree of expertise to manipulate and coordinate the control levers and foot pedals proficiently. To become productive, an inexperienced operator also requires a long training period to be familiar with the controls and their functions.

Some manufacturers recognize the disadvantages of having too many controls, and have adopted a two-lever control scheme as the norm. Generally, two vertically mounted two-axis levers share the task of controlling the movement of the work implement's appendages (boom and stick) and the bucket of the work implement. For example, hydraulic excavators presently manufactured by Caterpillar Inc. employ one joystick for stick and swing control, and another joystick for boom and bucket control. Similarly, Deere & Co. has a hydraulic excavator with a joystick for boom and swing control, and another for stick and bucket control. In each instance, the number of controls has decreased to two, making machine operation much more manageable. However, these two-lever control schemes are still not wholly desirable. The assignment of implement linkages to the joysticks is entirely arbitrary, and there exists little correlation between the direction of movement of the work implement linkages and those of the control levers.

Further, in a typical leveling operation (or slope finish) the operator has to manipulate the control levers about or along at least three axes to produce a linear movement of the bucket. The complexity and skill involved increase when performing these types of operations, thereby increasing operator fatigue and required training time.

The present invention is directed to overcoming the problems set forth above.

DISCLOSURE OF THE INVENTION

In one aspect of the present invention, an apparatus for controllably moving a vehicle's work implement is provided. The work implement includes a first appendage pivotally connected to the vehicle, and a second appendage pivotally connected to the first appendage. The apparatus senses the geometry of the work implement and responsibly produces a plurality of position signals and produces one of a manual control mode signal and an automatic control mode signal. An operator interface produces first and second lever command signals indicative of desired movement of the work implement. The apparatus receives the one control mode signal and the first and second lever control signals and responsively produces linear motion of the end point of the second appendage along first and second work axes if the one control mode signal is equal to the automatic control mode signal.

In another aspect of the present invention, a method for controllably moving a vehicle's work implement is provided. The implement includes a first appendage pivotally connected to the vehicle and a second appendage pivotally connected to the first appendage. The method includes the steps of sensing the geometry of the implement, sensing movement of a plurality of control levers, and producing a control signal in response to receiving one of a manual control mode signal and an automatic control mode signal. The method further includes the step of responsively producing linear motion of the second end point of the second appendage along first and second work axes in the automatic control mode.

BEST MODE FOR CARRYING OUT THE INVENTION

Figure 1:
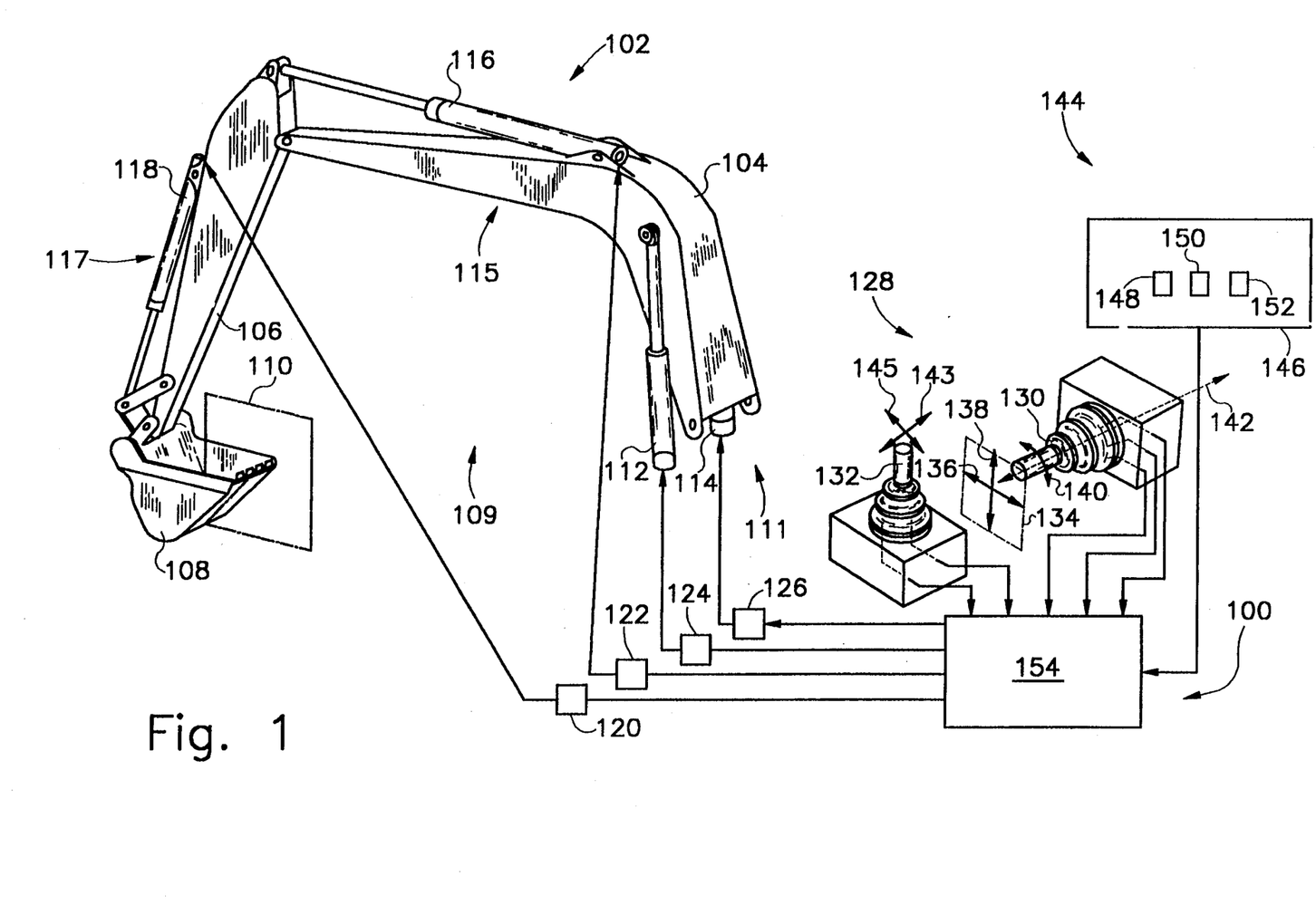
FIG. 1 is a diagrammatic view of the coordinated control system and the work implement.

With reference to FIG. 1, the present invention 100, hereafter referred to as a coordinated control system, is adapted to controllably provide linear movement of a work vehicle's work implement 102. The work implement 102 typically includes a first appendage 104, a second appendage 106, and a third appendage 108. For discussion purposes, the work vehicle is a hydraulic excavator, but the instant control system 100 is also suitable for application on other vehicles such as backhoe loaders, front shovels, wheel loaders, track loaders, and skidders.

In the preferred embodiment, the appendages (or linkages) correspond to the boom 104, stick 106, and bucket 108 of the hydraulic excavator, as shown. However, the implement configuration can differ from machine to machine, and the configuration may include a working device other than a bucket, such as a clam shell or grapple. In certain machines, such as the excavator, the operator cab together with the work implement is rotatable along a vehicle center axis; in others, such as a the backhoe loader, the operator cab is stationary and the work implement is swingable to a different site at the pivot at the base of the boom. This difference is not significant and the implementation of the coordinated control system 100 in the two cases will be substantially identical.

The work implement 102 of the work vehicle is generally actuated in a vertical plane 110, and swingable, with the operator cab, to a plurality of second planes different from the first plane by rotating the vehicle platform or swinging at the pivot base of the boom. The boom 104 is actuated by a first hydraulic actuating means 111 having two hydraulic cylinders 112,114 enabling raising and lowering of the work implement 102. The stick 106 is drawn toward and away from the vehicle by a second hydraulic actuating means 115. The second actuating means 115 includes a hydraulic cylinder 116. A third hydraulic actuating means 117 includes another hydraulic cylinder 118. The third actuating means 117 "opens" and "closes" the bucket (referred to as the curling function). The hydraulic flow to the hydraulic cylinders 112,114,116,118 are regulated by hydraulic control valves 120,122,124,126.

An operator interface means 128 provides operator input to the coordinated control system 100. The operator interface means 128 includes a first control lever 130 and a second control lever 132.

In one embodiment, the control levers 130,132 are electronic (inductive) control levers (or joysticks). One suitable joystick is available from CTI Electronics of Bridgeport, Conn., USA, but other types may also be used. The output of the electronic joysticks are electrical signals indicative of the relative movement along or about predefined axes.

In another embodiment, the control levers 130,132 are mechanical joysticks. The control levers actuate pilot systems (not shown) of the vehicle's hydraulic system. In the manual modes, the pilot systems actuate control valves for each of the respective cylinders. In the automatic or semi-automatic modes, the pilot systems are circumvented by 10 the electronic controls. However, the pilot systems include pressure sensors for producing signals indicative of the control levers 130,132 relative movement.

In one embodiment, the first control lever 130 has three degrees of movement, all in one plane 134 substantially parallel to work implement plane 110: towards the front and rear of the vehicle (along a first control axis 136), vertically up and down (along a second control axis 138), and rotationally, shown by arrow 140 (about a third control axis 142). The second control lever 132 is movable to the left and right of the vehicle (along a fourth control axis 143).

In another embodiment, the first control lever 130 has two degrees of movement: along the first control axis 136 and along the second control axis 138. The second control lever 132 also has two degrees of movement: along the fourth control axis 143 and towards the front and the rear of the vehicle (along a fifth control axis 145).

The first control lever 130 generates one signal for each respective degree of movement, each signal representing the control lever displacement direction and velocity from neutral. Similarly, the second control lever 132 generates a signal for the left-right displacement direction and velocity for implement side swing control.

A means 144 produces an electrical signal indicative of a desired slope angle (discussed below). In one embodiment, the means 144 includes a thumb wheel switch 146 having three indicators 148,150,152. The first indicator 148 is movable between a positive position (indicative of a positive desired slope angle) and a negative position (indicative of a negative 10 desired slope angle). The second and third indicators 150,152 are each movable between ten positions (0-9) representing the magnitude of the desired slope angle (between zero and ninety degrees). In an other embodiment, the means 144 includes a LED display and a series of buttons for displaying and inputting the desired slope angle.

In the preferred embodiment, the means 144 also includes means for generating an other electrical signal indicative of a desired bucket angle. The means 144 also includes means for generating a desired mode signal.

The electric signals are received by a logic means 154, which in response delivers to the hydraulic control valves 120,122,124,126 a plurality of work implement control signals.

Figure 2:
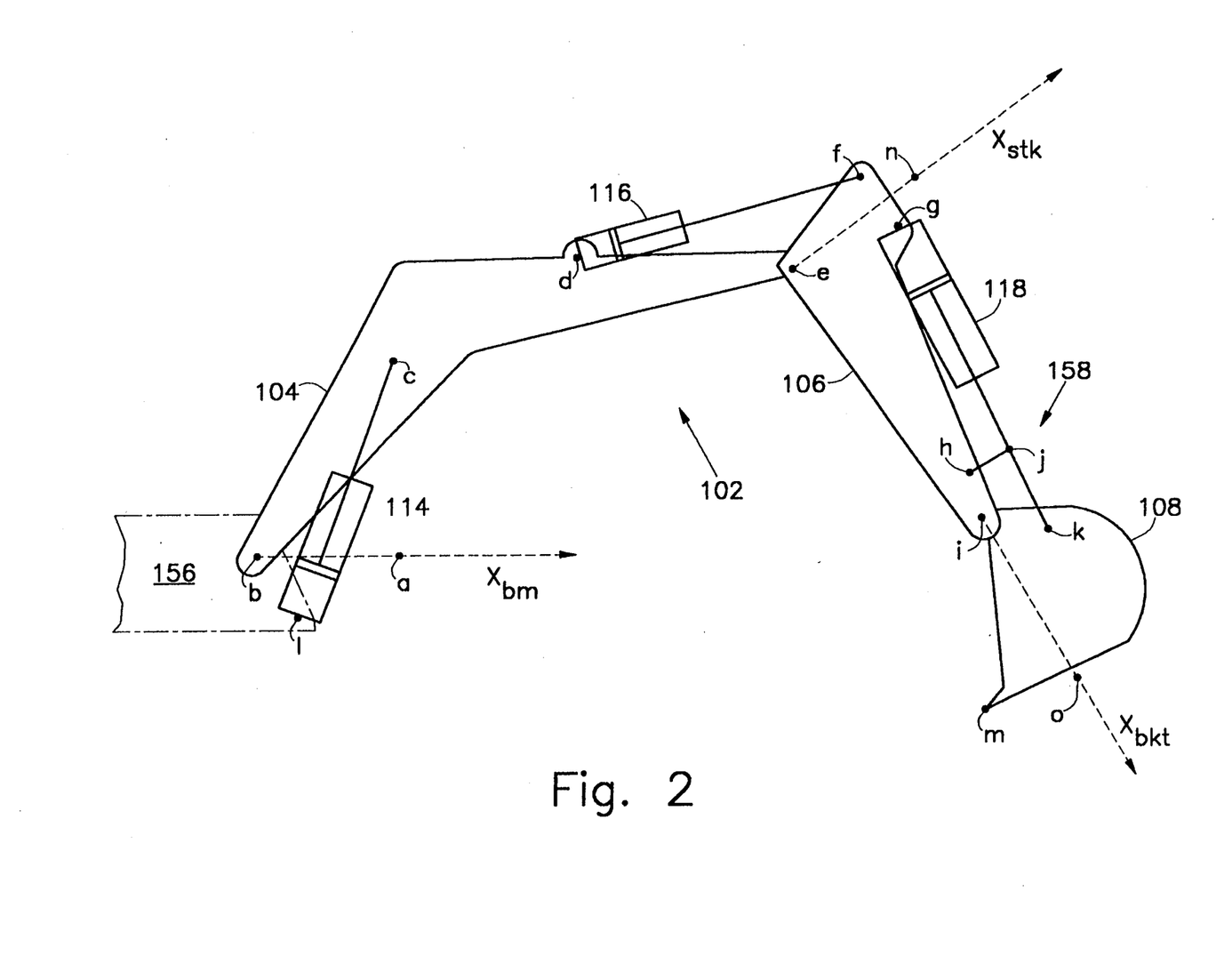
FIG. 2 is a diagrammatic view of the work implement illustrating pertinent points on the work implement.

Referring to FIG. 2, a simplified view of the work implement 102 is shown, defining a number of points and axes used by the logic means 154. The work implement 102 is pivotally mounted on a portion of the excavator's cab 156 at pivot point b. An axis, $X_{bm}$, is defined, having an origin at point b and a constant direction with respect to the cab 156. Axis $X_{bm}$ is used to measure the relative angular relationship between work vehicle 156 and the boom 104. Point a is defined as a point on axis $X_{bm}$. The boom hydraulic cylinders 112,114 (for simplicity only one is shown) is connected between the work vehicle 156 and the boom 104 at points l and c, respectively.

The stick 106 is pivotally connected to the boom 104 at point e. The stick hydraulic cylinder 116 is connected between the boom 104 and the stick 106 at points d and f, respectively. An axis, $X_{stk}$, is defined, having an origin at point e and a direction constant with respect to the boom 104. Axis $X_{stk}$ is used to measure the relative angular relationship between the boom 104 and the stick 106. Point n is defined as a point on axis $X_{stk}$.

The bucket 108 is pivotally connected to the stick 106 at point i. An axis $X_{bkt}$ is defined, having an origin at point i and a constant direction with respect to the stick 106. Point o is defined as a point on $X_{bkt}$. The bucket hydraulic cylinder 118 is connected to the stick 106 at point g and to a linkage 158 at point j. The linkage 158 is connected to the stick 106 and the bucket 108 at points h and j, respectively. A point m is defined at the tip of the bucket 108.

Figure 3:
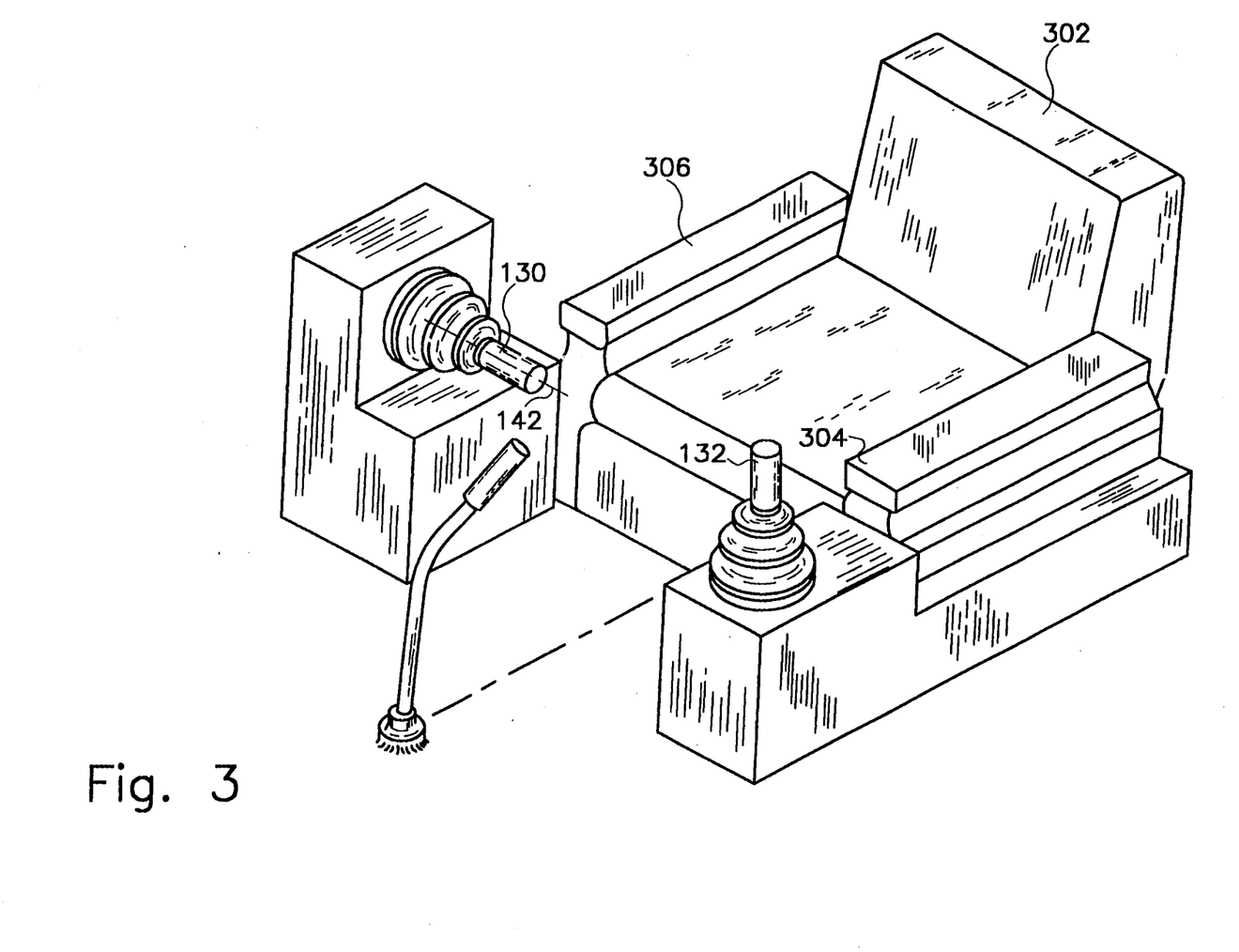
FIG. 3 is an isometric view of the control levers mounted with respect to an operator seat.

Referring now to FIG. 3, an isometric view of the operator seating area and manual controls is shown. The operator, when seated in an operator seat 302, can rest his or her arms on arm rests 304,306 where the control levers 130,132 are within easy reach. In one embodiment, the first control lever 130 is mounted substantially horizontal and the second control lever 132 is mounted substantially vertical, as shown. In another embodiment, both control levers 130,132 are mounted substantially vertical.

In one embodiment of the instant invention, the control system 100 has six modes of operation:
A. manual control mode,
B. manual control mode with bucket attitude control, C. linear control mode,
D. linear with constant bucket attitude control mode,
E. slope finish control mode, and
F. slope finish with constant bucket attitude control mode.

Each mode is explained in depth below.

In the manual control mode, the control levers 130,132 control movement of the work implement appendages (boom, stick, bucket) 104,106,108 independently, that is, movement of the first control lever 130 along a specific control axis 136,138,142 corresponds to a specific linkage on the implement.

In one embodiment, movement of the first control lever 130 in directions along the first control axis 136 controls the flow of hydraulic fluid to the stick hydraulic cylinder 116 and movement of the first control lever 130 in directions along the second control axis 138 controls the flow of fluid to the boom hydraulic cylinders 112,114. Further, rotational movement of the first control lever 130 about the third control axis 142 controls the curling motion of the bucket 108 and movement of the second control lever 132 along the fourth control axis 143 controls the swing motion of the excavator cab.

In another embodiment, movement of the horizontal control lever 130 in directions along the first control axis 136 controls the flow of hydraulic fluid to the boom hydraulic cylinders 112,114 and movement of the horizontal control lever 130 in directions along the second control axis 138 controls the curling motion of the bucket 108. Further, movement of the second control lever 132 along the fourth control axis 143 controls the swing motion of the excavator cab and along the fifth control axis 145 controls the flow of hydraulic fluid to the stick hydraulic cylinder 116.

In the manual with bucket attitude control mode, the operator retains manual control of the boom and stick hydraulic circuits. However, the bucket circuit is controlled automatically to adjust the bucket to retain a constant bucket angle with respect to a horizontal plane. Actuation of one of the control levers 130,132, as discussed above, may be used to adjust the bucket angle during operation.

Figure 4:
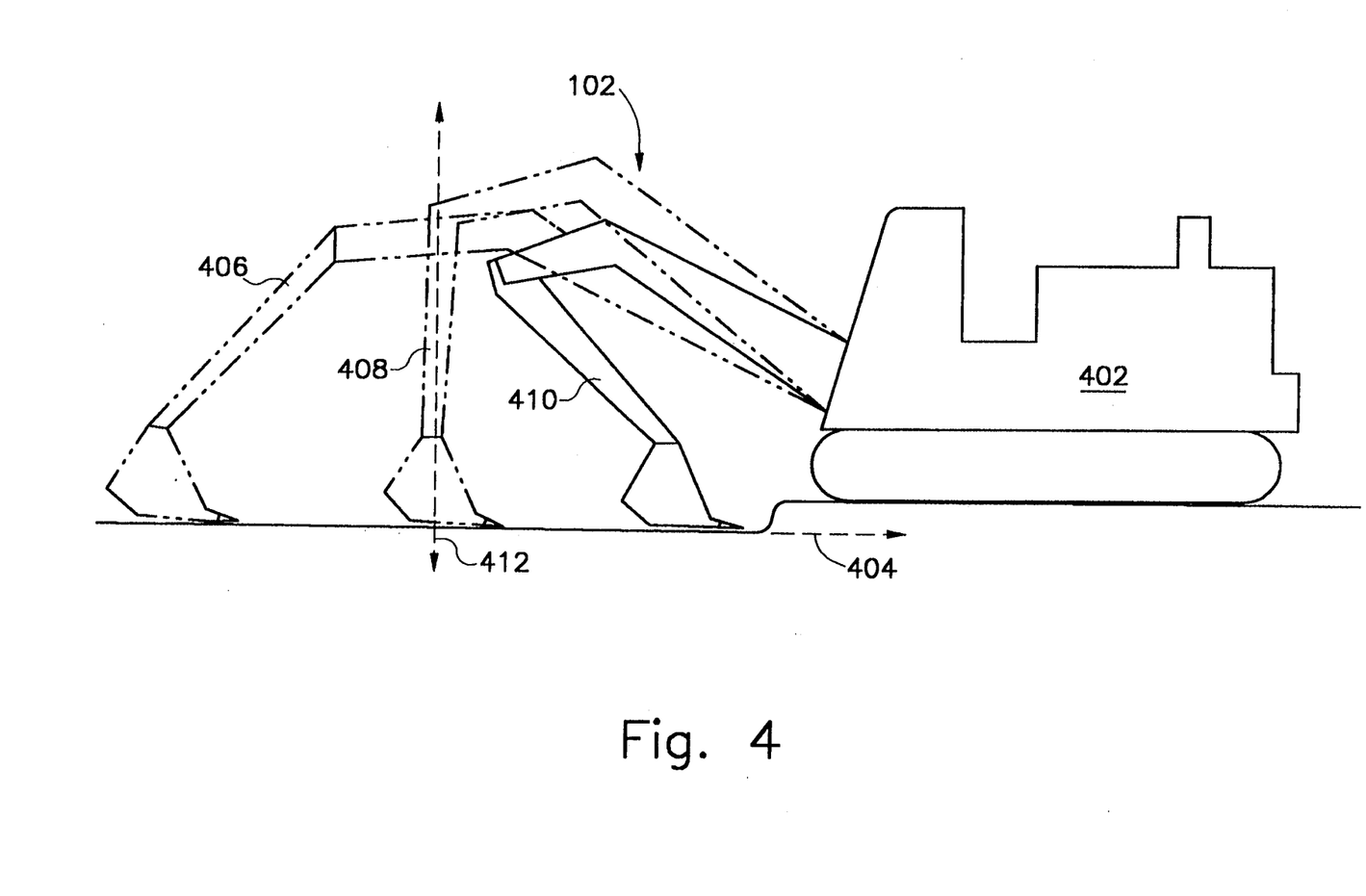
FIG. 4 is a side view of the vehicle performing bucket level motion with phantom lines illustrating implement movement.
Figure 5:
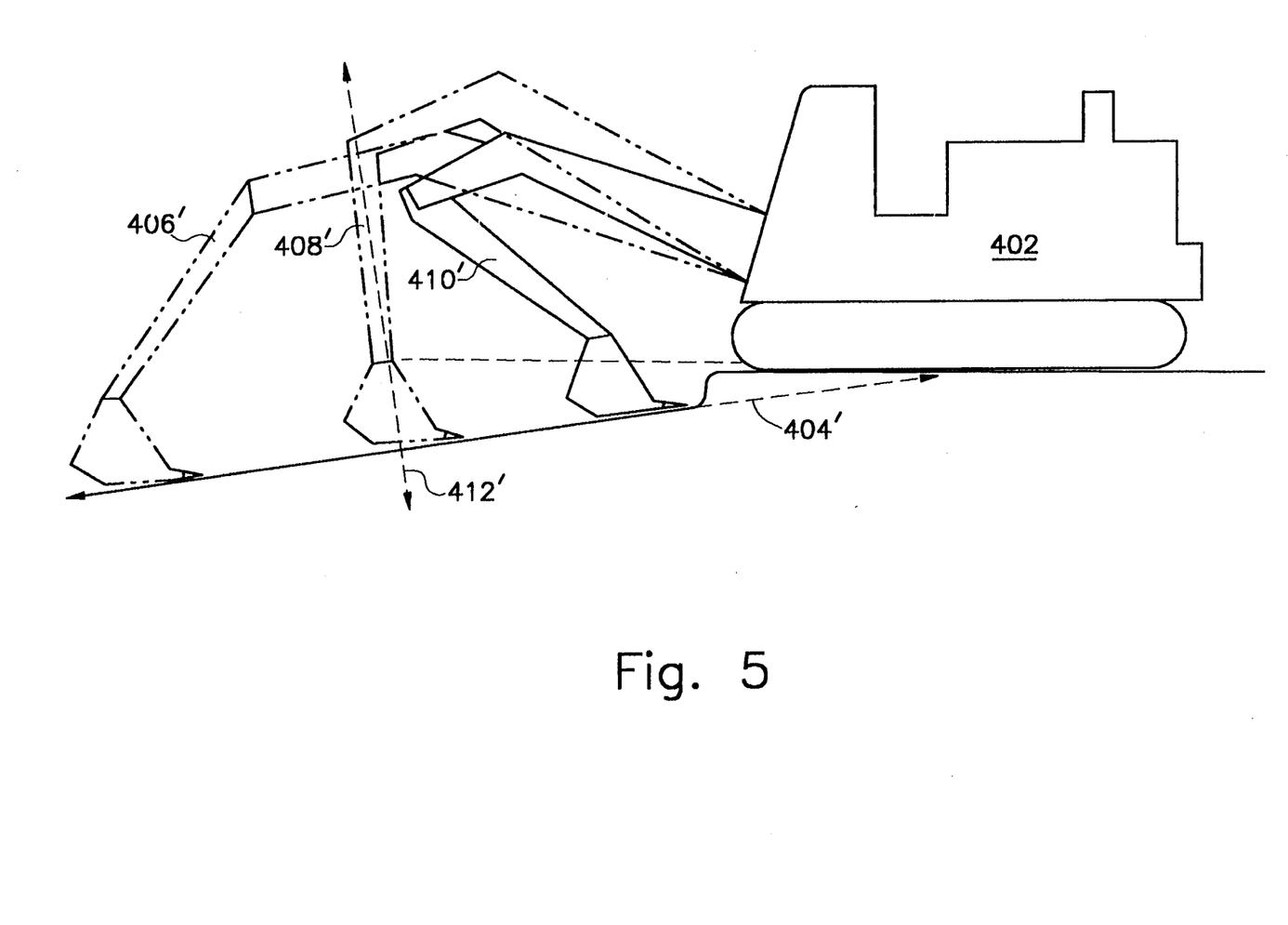
FIG. 5 is a side view of the vehicle performing slope finish motion with phantom lines illustrating implement movement.

In the four remaining automatic or semi-automatic control modes, the control of the appendage movements are simultaneously coordinated to provide linear movement. With reference to FIGS. 4 and 5, the work implement 102 of a work vehicle 302 has a substantially linear bucket motion with respect to the vehicle 304.

In all four coordinated modes, the direction and velocity of the linear motion is prescribed by the movement of one control lever 130,132 along one control axis 136,138,143,145.

In one embodiment of the linear control mode, movement of the control levers 130,132 along or about the control axes 136,138,142,143 provide the following functions:

| first control axis 136 | linear horizontal movement of point i |
| second control axis 138 | linear vertical movement of point i |
| third control axis 142 | curling function of the bucket, and |
| fourth control axis 143 | swing control. |

With reference to FIG. 4, movement of the first control lever 130 along the first control axis 136 provides a linear horizontal movement of point i. The linear motion of point i is accomplished by automatically coordinating the flow of hydraulic fluid to the boom and stick cylinders 112,114,116 (discussed below). Manual control over the curling and swing functions remain the same as in the manual control mode.

In another embodiment of the linear control mode, the control levers 130,132 are each moveable along two control axes 136,138,143,145. Movement along each control axis 136,138,143,145 corresponds to one of the control functions, as described above.

In still another embodiment, the angular relationship between the bucket and the stick remains constant and linear motion of point m is provided. In other words, the bucket 108 is treated as an extension of the stick 106.

The linear with constant bucket attitude mode is similar to the linear control mode, except that manual control over the curling function is eliminated. Linear motion of point i is provided in the same manner as described above. In addition the actuation of the bucket hydraulic cylinder 118 is coordinated such that a constant bucket angle with respect to the vehicle 302 is maintained. Therefore, in drawing the bucket level toward the vehicle, all three linkages require simultaneous and coordinated control.

In accordance with the control modes described above, the present invention provides a system 100 which actuates the vehicle hydraulics according to the control modes. The control system 100 includes a means 603 for sensing the geometry of the work implement 102 and responsibly producing a plurality of position signals.

The means 144 produces one of a manual control mode signal and an automatic control mode signal. In the preferred embodiment, there are two manual modes and four automatic modes: manual control mode, manual with bucket attitude control mode, linear control mode, linear with bucket attitude control mode, slope finish control mode, and slope finish with bucket attitude control mode.

The operator interface means 128 produces first and second lever command signals indicative of desired movement of the work implement 102.

The logic means 154 for receives the one control mode signal and the first and second lever control signals, responsively produces linear motion of the second end point of the second appendage 106 along first and second work axes 404,412,404',412' if the one control mode signal is equal to the automatic control mode signal, and responsively produces angular motion of the first and second appendages 104,106 in proportion to the first and second lever command signals, respectively, if the one control signal is equal to the manual control mode signal.

The logic means includes:
1. a means for receiving the position signals and for responsibly calculating a plurality of mode value signals ($r_{pq}$). The mode value signals are in terms of angular velocities of the appendages if the one control mode signal is equal to the automatic control mode signal;
2. a means for responsibly calculating a plurality angular-to-linear value signals ($s_o$). The angular-to-linear value signals are in terms of linear velocity/angular velocity if the one control mode signal is equal to the automatic control mode signal; and
3. a means for calculating a plurality of transformation signals (t) as a function of the angular-to-linear value and mode value signals; and for calculating a plurality of cylinder velocity command signals as a function of the mode value signals and the angular-to-linear value signals.

The actuating means 109 receives cylinder velocity command signals and responsibly actuates the work implement 102.

FIG. 4 specifically illustrates linear motion of the work implement along a first work axis (X) 404. The first work axis 404 is substantially parallel to the plane of the vehicle 402. In the first phantom outline 406, the stick is out and the bucket is in a closed position. As the first control lever 130 is pulled towards the rear of the vehicle along the first control axis 136, the work implement 102 is drawn to the position shown by the second phantom outline 408, the boom is raised, stick closer to the vehicle, and the bucket in a more open position. At the final position shown by the solid outline 410, the boom is lowered, the stick is drawn in, and the bucket is open.

Linear vertical movement along a second work axis 412 is performed in response to movement of the first control lever 130 along the second control axis 138 in a similar manner. The second work axis (Y) 412, shown at the second phantom outline 408, is perpendicular to the first work axis 404.

FIG. 5 specifically illustrates linear motion of the work implement along a first work axis (X') 404'. The first work axis 404' has an angular relationship with the vehicle 402. The slope angle is defined by the means 144. In the first phantom outline 406' the stick is out and the bucket is in a closed position. As the first control lever 130 is pulled towards the rear of the vehicle along the first control axis 136, the work implement 102 is drawn to the position shown by the second phantom outline 308', the boom is raised, stick closer to the vehicle, and the bucket in a more open position. At the final position shown by the solid outline 410', the boom is lowered, the stick is drawn in, and the bucket is open.

Linear vertical movement along a second work axis (Y') 412' is performed in response to movement of the first control lever 130 along the second control axis 138 in a similar manner. The second work axis 412', shown at the second phantom outline 408', is perpendicular to the first work axis 404'.

In a vehicle with conventional controls where each linkage is controlled independently, all the linkage motions are explicitly controlled and manipulated by the operator. Since the primary concern of the vehicle operator is the placement of the bucket, all four coordinated control modes of the instant invention allows exact operator displacement and directional control of the bucket regardless of the geometry of the work implement. Therefore, to perform bucket level motion such as in floor finishing, the operator needs only move the first control lever 130 towards the front or rear of the vehicle.

In the preferred embodiment, the logic means 154 is implemented on a microcontroller. Typically, the microcontroller is microprocessor based. One suitable microprocessor is available from Motorola Inc. of Roselle, Ill. as part no. MC68332, but any suitable microprocessor is applicable.

Figure 6:
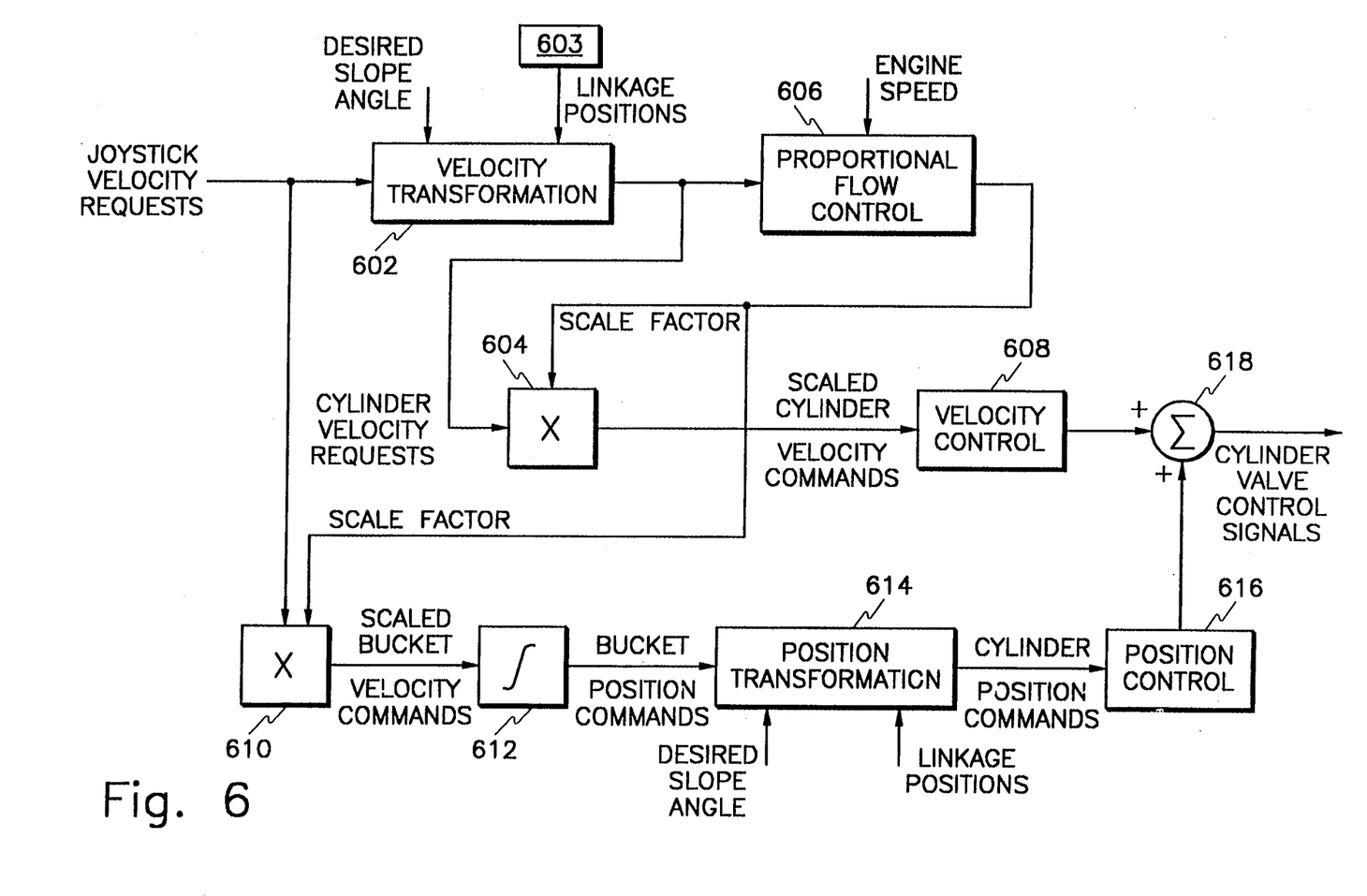
FIG. 6 is a block diagram of the coordinated control implementation.

Referring now to FIG. 6, a block diagram of the coordinated control as implemented on the logic means 154 in software is shown. The electric signals which are generated by the control levers 130,132 are shown as joystick velocity request inputs to the block diagram. These velocity request signals are in Cartesian coordinates corresponding to the control lever movement. The velocity requests are transformed at block 602 to a different coordinate system based on the configuration and position of the linkages.

A means 603 senses the geometry of the work implement 102 and responsibly produces a plurality of position signals. In one embodiment, the linkage position sensors include linkage angle resolvers for measuring the relative angles between linkages. In an other embodiment, the linkage position sensors include linear sensors for sensing the length or extensions of individual cylinders. Examples may be found in *Robot Manipulators: Mathematics, Programming and Control* by Richard P. Paul, MIT Press, 1981.

The position signals are received by the velocity transformation.

The upper portion of the coordinated control implementation of FIG. 6 (blocks 602,604,606,608) provides for manual control of the flow of hydraulic fluid to the hydraulic cylinders 112,114,116,118 through the use of the control levers 130. The cylinder velocity requests (or joint angular velocity) from this translation process are scaled at block 604 by a factor obtained in the proportional flow control block 6.06. Proportional hydraulic flow control is discussed in U.S. Pat. No 4,712,376 issued to Hadank and Creger on Dec. 15, 1987. The basic concept of the proportional flow control involves calculating the amount of hydraulic flow available for implement actuation lander current operating conditions (that is, engine speed, vehicle travel, etc.) The resultant scaled velocity request from block 604 is passed on to velocity control block 608 where an open or closed loop control determines the hydraulic valve velocity control signals to satisfy the cylinder velocity request. Such open or closed loop control systems are well known in the field of control theory and are therefore not discussed further. The hydraulic control valve signals are complemented with another set of signals to eliminate errors introduced in the Cartesian to linkage coordinate transformation.

Referring now to block 610, the joystick velocity requests are scaled with the same factor obtained in proportional flow control. The scaled joystick velocity commands are integrated over time to obtain position commands 612 and transformed to the linkage coordinates 614. This transformation is similar to that of the transformation process in block 602. The output of position transformation block 614 is then passed on to another open or closed loop control 616 where hydraulic valve position control signal is determined. A suitable closed loop control using position and velocity control is disclosed in U.S. patent application Ser. No. 07/540,726, filed on Jun. 15, 1990 and commonly assigned.

The hydraulic valve control signals from both branches are combined at an adder 618 to arrive at the final cylinder valve control signals for the work implement. In the manual mode the lower portion of the control implementation is non-operable; the cylinder valve control signals are directly related to the velocity requests from the control levers (joysticks) 130,132.

While running in one of the coordinated control modes, the lower portion (blocks 610–616) of the control implementation are effective and part of the upper portion may also be operable. For example, in the linear with bucket attitude control mode, the lower portion of the control implementation coordinates the flow of fluid to the hydraulic cylinders 112,114,116,118 in accordance with the horizontal and vertical velocity requests. The swing motion of the work implement 102 remains under manual control through blocks 602–608. Further, a bucket velocity request may be accepted by the control implementation from one of the control levers 130,132. This signal would be modified (as discussed above) to produce a bucket cylinder correction signal. The bucket cylinder correction signal would be added to the requested bucket velocity signal from the lower portion of the control implementation. This function allows the operator to correct, modify, or adjust the flow of hydraulic fluid to the bucket hydraulic cylinder 118 during bucket attitude control.

The Cartesian to linkage coordinate transformations discussed above use the bucket pin as a reference point and do not take into consideration bucket tip position. However, if it is more intuitive for the operator to operate the vehicle with the bucket tip as the significant end point, translation can be easily expanded to accommodate the bucket linkage.

In order to perform closed loop control using cylinder position feedback, the relative displacement (extension and retraction) of each cylinder 112,114,116,118 must be available. In the preferred embodiment, sensors (means 603) are used to measure the relative angles between the work vehicle 156, the boom 104, the stick 106 and the bucket 108.

In an alternate embodiment, the cylinder displacement is measured directly. One suitable sensor is the radio frequency (RF) linear position sensor, as disclosed in U.S. Pat. No. 4,737,705, issued Apr. 12, 1988 to Bitar, et al. A potentiometer based sensor may also be used.

Below, in a discussion describing in depth the derivation of the calculations used in the coordinated control implementation, the following designations are used:

| | |
|---|---|
| L | a length of constant magnitude, |
| λ | a length of varying magnitude, |
| A | an angle of constant magnitude, and |
| Θ | an angle of varying magnitude. |

Referring back to FIG. 2, each length (L,λ) has two subscripts, which define the two points between which the length is referenced. Each angle (A,Θ) has three subscripts, which define the the lines between which the angle is measured (the middle subscript being the vertex of the angle).

The following equations (1)–(51) show the derivation of the calculation used to perform the various control modes. The equations are dependent upon the particular geometry of the work implement, as shown in FIGS. 1 and 2. However, the present invention is not limited to one geometry. Similar derivations are used to adapt the present invention to different work implement geometries.

If joint angle resolvers are used to measure linkage positions, the measured relative angles from the resolvers must be converted to cylinder displacements. Based on the law of cosines, the relative cylinder displacement of the boom hydraulic cylinders 112,114, $\lambda_{cl}$ is determined by the formula:

$$\lambda_{cl} = \{[L_{bi}^2 + L_{bc}^2 - 2L_{bi}L_{bc}\cos(A_{abl} + A_{cbe} + \Theta_{abe})]\}^{\frac{1}{2}}. \tag{1}$$

Likewise, the relative displacement of the stick hydraulic cylinder 116 is determined by the formula:

$$\lambda_{df} = \{[L_{de}^2 + L_{ef}^2 - 2L_{de}L_{ef}\cos(\pi - A_{bed} - A_{fei} - \Theta_{bei})]\}^{\frac{1}{2}}. \tag{2}$$

Similarly, the relative displacement of the bucket hydraulic cylinder 118 is determined by the formula:

$$\lambda_{gj} = \{[L_{gh}^2 + L_{hj}^2 - 2L_{gh}L_{hj}\cos(2\pi - A_{ehg} - A_{ehj} - \Theta_{jhi})]\}^{\frac{1}{2}}. \tag{3}$$

In the preferred embodiment, the measured angle ($\Theta_{jhi}$) is on the linkage 158. To determine the angle of the bucket 108, $\Theta_{oim}$, relative to the stick 106 the following set of equations are used:

$$\Theta_{jhi} + \Theta_{hji} + \Theta_{kji} + \Theta_{jki} + \Theta_{hik} = 2\pi, \tag{4}$$

$$\Theta_{oik} = A_{kim} + \Theta_{oim}, \text{ and} \tag{5}$$

$$\Theta_{hik} + A_{eih} + \Theta_{oik} = \pi. \tag{6}$$

$$\Theta_{oim} = -\pi + \Theta_{hji} + \Theta_{kji} + \Theta_{jki} - A_{eih} - A_{kim} + \Theta_{jhi}. \tag{7}$$

Where, $$\Theta_{hji} = \cos^{-1}[(\lambda_{ij}^2 + L_{hj}^2 - L_{hi}^2)/(2L_{hj}\lambda_{ij})], \tag{8}$$

$$\Theta_{kji} = \cos^{-1}[(\lambda_{ij}^2 + L_{jk}^2 - L_{ik}^2)/(2L_{jk}\lambda_{ij})], \tag{9}$$

$$\lambda_{ij} = \{[L_{hi}^2 + L_{ju}^2 - 2L_{hi}L_{nj}\cos(\Theta_{jhi})]\}^{\frac{1}{2}}, \text{ and} \tag{10}$$

$$\Theta_{jki} = \cos^{-1}[(L_{jk}^2 + L_{ik}^2 - \lambda_{ij}^2)/(2L_{jk}L_{ik})]. \tag{11}$$

Figure 7:
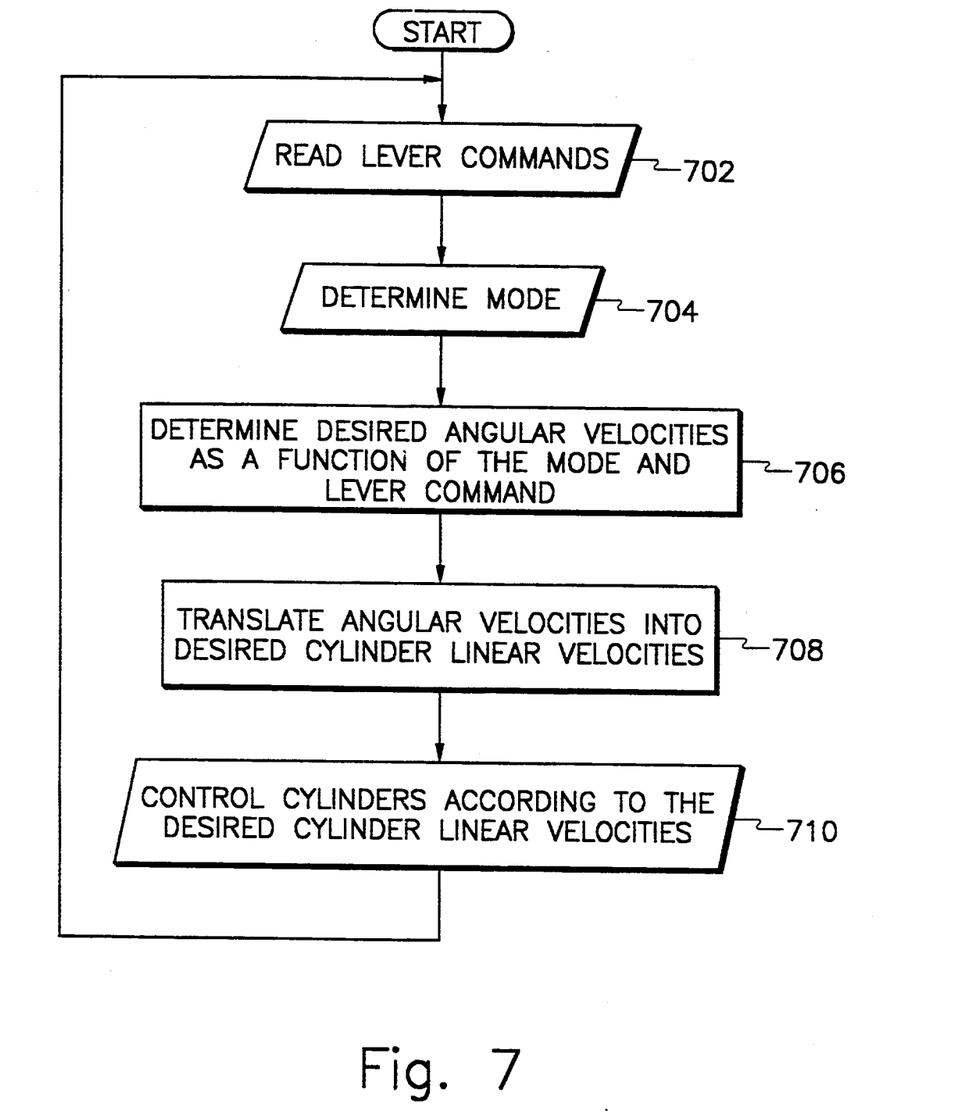
FIG. 7 is a flow diagram illustrating the operation of the control implementation.
Figure 8:
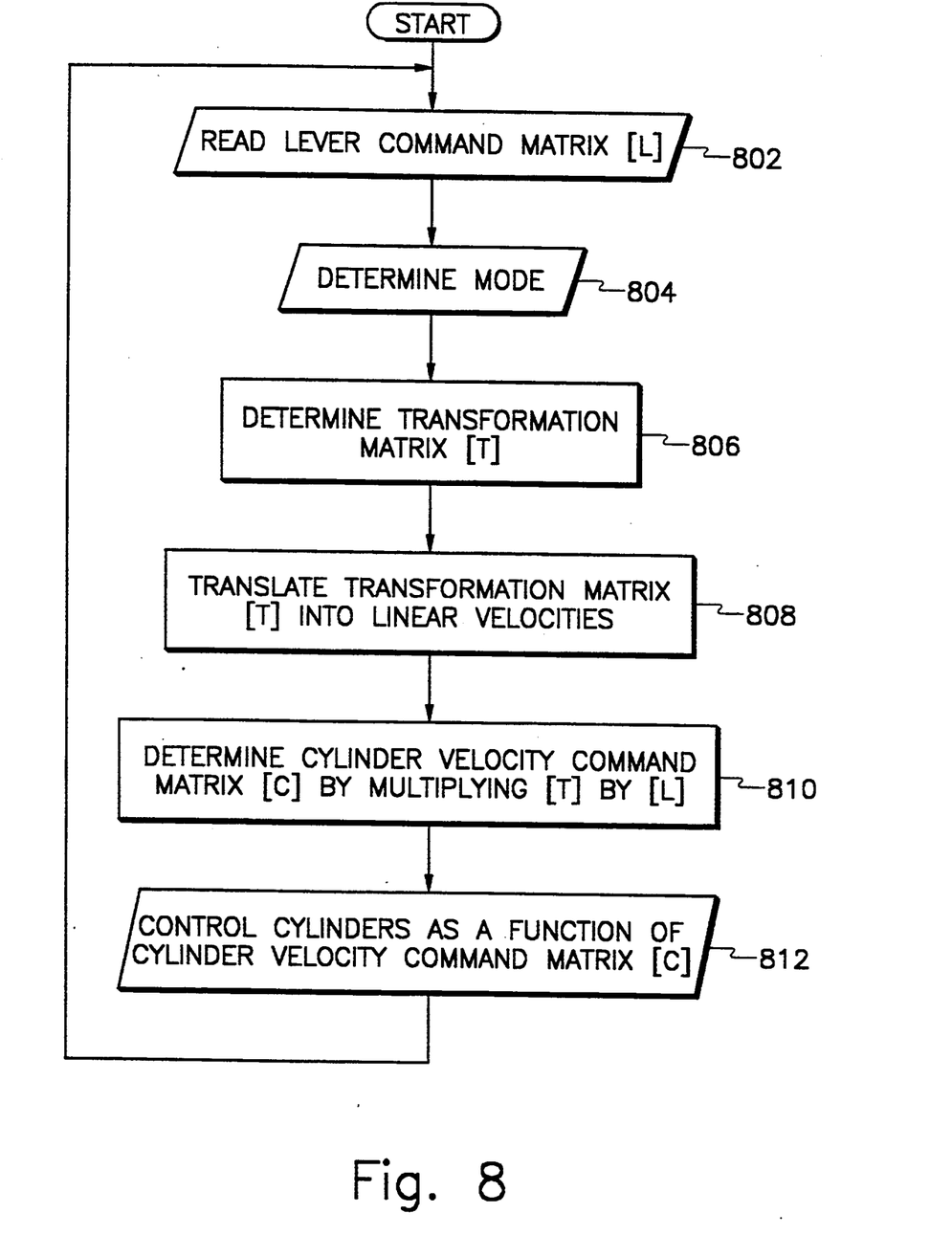
FIG. 8 is a flow diagram illustrating the operation of the control implementation according to a preferred embodiment of the present invention.

With reference to FIG. 7, the operation of the present invention is as follows: first in a control block 702 the lever command signals are read from the control levers. In a control block 704, the desired mode is read from the means 144.

In a control block 706, the desired angular velocities of the boom, stick, and bucket linkages are determined as a function of the mode and the lever command signals.

In a control block 708, the angular velocities are translated into linear velocities of the linkage cylinders. The linear velocities are then used to controllably actuate the cylinders in control block 710.

In the linear control mode or the linear control with bucket attitude control mode, velocity request signals representative of the desired horizontal and vertical velocities are received from the control levers 130,132. The horizontal velocity request and the vertical request are integrated to determine the desired position components (x,y) of the bucket pin, point i. The desired position must be translated into desired cylinder velocity commands.

First, the desired position commands (x,y) are related to the boom 104:

$$x = L_{be}\cos\Theta_{abe} + L_{ei}\cos(\Theta_{abe} + \Theta_{bei}). \tag{12}$$

$$y = L_{be}\sin\Theta_{abe} + L_{ei}\sin(\Theta_{abe} + \Theta_{bei}). \tag{13}$$

$$\lambda_{bi} = \{[y^2 + x^2]\}^{\frac{1}{2}}. \tag{14}$$

$$\theta_{iba} = \tan^{-1}(y/x). \tag{15}$$

$$\Theta_{ebi} = \cos^{-1}[(\lambda_{bi}^2 + L_{be}^2 - L_{ei}^2)/(2\lambda_{bi}L_{be})]. \tag{16}$$

$$\Theta_{abe} = \Theta_{ebi} + \Theta_{iba}. \tag{17}$$

$$\Theta_{abe} = \cos^{-1}[*\lambda_{bi}^2 + L_{be}^2 - L_{ei}^2)/(2\lambda_{bi}L_{be})] + \tan^{-1}(y/x). \tag{18}$$

Where, $\Theta_{abe}$ is the desired boom angle.

$\Theta_{abe}$ is transformed into desired boom cylinder length, $\lambda_{cl}$, by equation 1.

Equation 17 is differentiated to determined the desired angular velocity of the boom 104:

$$\Theta'_{abe} = \Theta'_{ebi} + \Theta'_{iba}. \tag{19}$$

$$\Theta'_{abe} = [(\cos\Theta_{ebi}/\lambda_{bi}\sin\Theta_{ebi}) - (1/L_{be}\sin\Theta_{ebi})]\lambda'_{bi} + (1/\lambda_{bi}^2)(xy' - yx'). \tag{20}$$

$$\lambda'_{bi} = (yy' + xx')/\lambda_{bi}. \tag{21}$$

$$\Theta'_{abe} = \{x[(\cos\Theta_{ebi}/\lambda_{bi}) - (1/L_{be})]/\lambda_{bi}\sin\Theta_{ebi}) - y(1/\lambda_{bi}^2)\}x' + \{y[(\cos\Theta_{ebi}/\lambda_{bi}) - (1/L_{be})]/\lambda_{bi}\sin\Theta_{ebi}) + x(1/\lambda_{bi}^2)\}y'. \tag{22}$$

Where, "'" denotes differentiation.

The desired boom cylinder velocity is determined using the equation:

$$\lambda_{cl}' = [L_{bc} L_{bl} \sin(A_{abl} + A_{cbe} + \Theta_{abe})/\lambda_{cl}]\Theta'_{abe}. \tag{23}$$

The desired stick angle is:

$$\Theta_{bei} = \cos^{-1}[(L_{be}^2 \pi L_{ei}^2 - \lambda_{bi}^2)/(2L_{bc}L_{ei}O] - \pi. \tag{24}$$

Using equations 2 and 14, desired stick angular velocity is:

$$\Theta'_{bei} = [x/L_{be}L_{ei}\sin(\Theta_{bei}+\pi)]x' + \{y/(L_{be}L_{ei}\sin(-\Theta_{bei}+\pi)]y'. \tag{25}$$

The desired stick cylinder velocity is then determined by the equation:

$$\lambda'_{df} = -[(L_{de}L_{ef}\sin(\pi - a_{deb} - A_{fei} - \Theta_{bei})/\lambda_{df}]\Theta'_{bei}. \tag{26}$$

The calculations of boom and stick desired cylinder velocities in the slope finish control mode and the slope finish with bucket attitude control mode are similar to those used in the linear control mode and the linear with bucket attitude control mode, except that the desired slope angle, $\tau$, is introduced into the equations.

Therefore, the equations for the desired position of the bucket pin, point i, become:

$$x = L_{be}\cos(\Theta_{abe}+\tau) + L_{ei}\cos(\Theta_{abe}+\tau+\Theta_{bei}). \tag{27}$$

$$y = L_{be}\sin(\Theta_{abe}+\tau) + L_{ei}\sin(\Theta_{abe}+\tau+\Theta_{bei}). \tag{28}$$

The desired boom angle becomes:

$$\Theta_{abe} = \cos^{-1}[(\lambda_{bi}^2 + L_{be}^2 + L_{ei}^2)/(2\pi_{bi}L_{be})] + \tan^{-1}(y/x) + \tau. \tag{29}$$

Carrying the transformations through, the desired angular velocity of the boom and the stick 104,106 become:

$$\Theta'_{abe} = \{x\cos(\Gamma)[(\cos\Theta_{ebi}/\lambda_{bi}) - (1/L_{be})]/(\lambda_{bi}\sin\Theta_{ebi}) - y(1/\lambda_{bi}^2)\}x' + \{y\sin(\Gamma)[(\cos\Theta_{ebi}/\lambda_{bi}) - (1/L_{be})](/\lambda_{bi}\sin\Theta_{ebi}) - x(1/\lambda_{bi}^2)\}y'. \tag{30}$$

$$\Theta'_{bei} = -[x\sin(\Gamma)/(L_{bi}L_{ei}\sin(\Theta_{bei} + \pi)]x' + [y\cos(\Gamma)/(L_{bi}L_{ei}\sin(\Theta_{bei} + \pi)]y'. \tag{31}$$

The desired boom cylinder and stick velocities are calculated using equations 23 and 26.

In the bucket attitude control option, the bucket 108 is maintained at a constant angle with respect to the vehicle. During extension (or retraction) of the boom and stick hydraulic cylinders 112,114,116, the bucket attitude angle is maintained through actuation of the bucket hydraulic cylinder 118. The stick and boom desired velocity commands are not modified.

The bucket attitude angle is related to the resolver measured angles by the equations:

$$\Theta_{abe} + (\pi + \Theta_{bei}) + (\pi + \Theta_{oim}) + (\pi - \theta) = 2\pi. \tag{32}$$

$$\Theta_{oim} = \theta - \pi - \Theta_{abe} - \Theta_{bei}. \tag{33}$$

$$\Theta_{oim}' = \theta' - \Theta_{abe}' - \Theta_{bei}'. \tag{34}$$

Where, $\theta$, represents the bucket attitude angle.

To determine the desired angular velocity of the bucket 108, the angular velocity of the boom 104 and the stick 106 must be known.

The angular velocity of the boom is determined using commanded angular velocity as follows:

$$\lambda_{cl} = \{[L_{be}^2 + L_{bl}^2 - 2L_{bc}L_{bl}\cos(AS_{abl} + A_{cbe} + \Theta_{abe})]\}^{\frac{1}{2}}. \tag{35}$$

$$\lambda_{cl}' = [L_{bc}L_{bl}\sin(A_{abl} + A_{cbe} + \Theta_{abe})/\lambda_{cl}]\Theta_{abe}'. \tag{36}$$

$$\Theta_{abe}' = [\lambda_{cl}/(L_{bc}L_{bl}\sin(\Theta_{abe} + A_{abl} + A_{cbe}))]\lambda_{cl}'. \tag{37}$$

Likewise, the angular velocity of the stick 106 is determined:

$$A_{deb} + \Theta_{def} + A_{fei} + (\pi + \Theta_{bei}) = 2\pi. \tag{38}$$

$$\Theta_{bei} = \lambda - A_{deb} - A_{fei} - \Theta_{def}. \tag{39}$$

$$\Theta_{def} = \cos^{-1}[(L_{de}^2 + L_{ef}^2 - \lambda_{df}^2)/(2L_{de}L_{ef})]. \tag{40}$$

$$\Theta_{bei}' = -[\lambda_{df}/(L_{de}L_{ef}\sin(\pi - a_{deb} - A_{fei} - \Theta_{bei})]\lambda_{df}'. \tag{41}$$

Therefore, the desired bucket angular velocity is determined as:

$$\therefore \Theta_{oim}' = \theta' - [\lambda_{cl}/(L_{bc}L \sin(\Theta_{abe} + A_{abl} + A_{cbe}))]\lambda_{cl}' + [\lambda_{df}/(L_{de}L_{ef}\sin(-\pi - a_{deb} - A_{fei} - \Theta_{bei})]\lambda_{df}. \tag{42}$$

Where, $\Theta'$ is a requested bucket velocity input from one of the control levers 130,132.

The desired bucket cylinder velocity is determined using the desired angular velocity of the bucket and the equations:

$$\Theta_{jhi} = \pi - \Theta_{hji} - \Theta_{kji} - \Theta_{nji} + A_{eih} + A_{kim} + \Theta_{oim}. \tag{43}$$

$$\lambda_{ij}' = (L_{hi}L_{hj}\sin(\Theta_{jhi})/\lambda_{ij})\Theta_{jhi}'. \tag{44}$$

$$\Theta_{jhi}' = -\Theta_{hji}' - \Theta_{kji}' - \Theta_{jki}' + \Theta_{oim}'. \tag{45}$$

$$\Theta_{hji}' = \{L_{hi}\sin\Theta_{jhi}[L_{hj}\cos(\Theta_{hji})/\lambda_{ij} - 1]/(\lambda_{ij}\sin\Theta_{hji})\}\Theta_{jhi}'. \tag{46}$$

$$\Theta_{kji}' = \{L_{hi}L_{hj}\sin\Theta_{hji}[L_{nk}\cos(\Theta_{kji})/\lambda_{ij} - 1]/(L_{jk}\lambda_{ij}\sin\Theta_{kji}O)\Theta_{jhi}'. \tag{47}$$

$$\Theta_{jki}' = [L_{hi}L_{hj}\sin\Theta_{jhi}/(L_n L_{ik}\sin\Theta_{jki})]\Theta_{jhi}. \tag{48}$$

$$\Theta_{jhi}' = [1/(1 + \Theta_{hji}' + \Theta_{kji}' + \Theta_{jki}')]\Theta_{oim}'. \tag{49}$$

$$\lambda_{gj}' = (-L_{gh}L_{hj}\sin(2\pi - A_{ehg} - A_{ehi} - \Theta_{jhi})/\lambda_{gj})\Theta_{jhi}'. \tag{50}$$

In the slope finish with bucket attitude control mode, equation 33 is modified to compensate for the desired slope angle:

$$\Theta_{oim} = \theta - \pi - (\Theta_{abe} - \tau) - \Theta_{bei}. \quad (51)$$

The desire bucket cylinder velocity is determined in the same manner as described above.

As discussed above in reference to FIG. 6, the output of the coordinated control is a plurality of linear velocity requests. The velocity requests are used by the velocity control block 608. The velocity control block 608 uses an open or closed feedback scheme to control the operation of the hydraulic cylinders 112,114,116,118.

Since the lever inputs relate to different types of requests depending upon the control mode, the lever commands have different units of measure. For example, in the manual control mode, the lever command signals correspond to desired angular velocity of the respective linkages. In the automatic modes, at least two of the control lever signals correspond to desired linear velocity of a point on the linkage along an axis. Therefore, the coordinated control determine the mode being operated in and responsively convert the lever command signals which may be in terms of angular velocity or linear velocity to linear velocity requests.

In the preferred embodiment, the linear velocity commands are determined using matrix multiplication. The basic matrix equation is:

$$[C] = [T] \cdot [L]. \quad (52)$$

where [C] is the cylinder velocity command matrix, [T] is a transformation matrix, and [L] is a lever command matrix.

The cylinder velocity command matrix is a $3 \times 1$ matrix and is of the form:

$$[C] = \begin{bmatrix} c_1 \\ c_2 \\ c_3 \end{bmatrix}. \quad (53)$$

In the preferred embodiment, $c_1$ corresponds to the desired boom cylinder velocity signal and is proportional to the desired boom cylinder velocity, $c_2$, is corresponds to the desired stick cylinder velocity signal and is proportional to the desired stick cylinder velocity, and $c_3$ is the desired bucket cylinder velocity signal and is proportional to the desired bucket cylinder velocity.

The lever command matrix is a $3 \times 1$ matrix and is of the form:

$$[L] = \begin{bmatrix} l_1 \\ l_2 \\ l_3 \end{bmatrix}. \quad (54)$$

The significance of $l_1$, $l_2$, and $l_2$ varies depending upon the control mode.

In the manual mode, $l_1$ corresponds to the desired boom cylinder linear velocity, $l_2$ corresponds to the desired stick cylinder linear velocity, and $l_3$ corresponds to the desired bucket cylinder linear velocity.

In the manual mode with bucket attitude control, $l_1$ corresponds to the desired boom cylinder linear velocity, $l_2$ corresponds to the desired stick cylinder linear velocity, and $l_3$ corresponds to a desired bucket cylinder adjustment.

In the linear control mode, $l_1$ corresponds to the desired velocity along the horizontal axis (X), $l_2$ corresponds to the desired velocity along the vertical axis, and $l_3$ corresponds to the desired bucket angular velocity.

In the linear control mode with bucket attitude control, $l_1$ corresponds to the desired velocity along the horizontal axis, $l_2$ corresponds to the desired velocity along the horizontal axis, and $l_3$ corresponds to the desired bucket adjustment.

In the slope finish control mode, $l_1$ corresponds to the desired velocity along the X' axis, $l_2$ corresponds to the desired velocity along the Y' axis, and $l_3$ corresponds to the desired bucket angular velocity, where X' and Y' are defined by the offset angle.

In the slope finish control mode with bucket attitude control, $l_1$ = the desired velocity along the X' axis, $l_2$ = the desired velocity along the Y' axis, and $l_3$ = the desired bucket adjustment, where X' and Y' are defined by the offset angle.

The transformation matrix is a $3 \times 3$ matrix and is of the form:

$$[T] = \begin{bmatrix} t_{11} & t_{12} & t_{13} \\ t_{21} & t_{22} & t_{23} \\ t_{31} & t_{32} & t_{33} \end{bmatrix} \quad (55)$$

$$= \begin{bmatrix} s_1 \cdot r_{11} & s_1 \cdot r_{12} & s_1 \cdot r_{13} \\ s_2 \cdot r_{21} & s_2 \cdot r_{22} & s_2 \cdot r_{23} \\ s_3 \cdot r_{31} & s_3 \cdot r_{32} & s_3 \cdot r_{33} \end{bmatrix}.$$

As shown, each element of [T] consists of the product between an $r_{pq}$ term and a $s_o$ term. The $r_{pq}$ terms are dependent upon the operating mode (see below) and effectually convert the lever command signals into terms of desired angular velocities (based on the current control mode). The $s_o$ terms effectually convert from angular velocity to linear velocity.

Substituting equations (53)-(55) into equation (52), leaves:

$$c_1 = s_1 \cdot (r_{11} \cdot l_1 + r_{12} \cdot l_2 + r_{13} \cdot l_3). \quad (56)$$

$$c_2 = s_2 \cdot (r_{21} \cdot l_1 + r_{12} \cdot l_2 + r_{23} \cdot l_3). \quad (57)$$

$$c_3 = s_3 \cdot (r_{31} \cdot l_1 + r_{32} \cdot l_2 + r_{33} \cdot l_3). \quad (58)$$

As stated above, each of the terms in equations varies, dependent upon the mode. The equation for each term in each is based on the derivations above and will now be discussed.

In the manual mode, the lever command signals are indicative of the desired hydraulic flow to each of the cylinders 112,114,116,118. Therefore the lever command signals are passed to the velocity control block 608. The terms have the following values:

$r_{11} = r_{22} = r_{33} = 1$ and
$r_{12} = r_{13} = r_{23} =$
$r_{31} = r_{21} = r_{32} = 0.$
Therefore,
$c_1 = l_1,$
$c_2 = l_2,$ and $$c_3 = l_3,$$

In the manual mode with bucket attitude control, the boom and stick cylinders are treated the same as in the manual mode. Only the terms relating to the bucket cylinder are changed.

$r_{11} = r_{22} = 1$ and
$r_{12} = r_{13} = r_{23} = r_{21} = 0$.
$r_{31} = A$,
$r_{32} = A \cdot B$, and
$r_{33} = A \cdot C$, where $$A = \frac{1}{1 + \theta'_{hji} + \theta'_{kjl} + \theta'_{jkl}}, \quad (59)$$

$$B = \frac{\lambda_{lc}}{L_{bc} \cdot L_{ef} \cdot \sin(A_{abe} - A_{abl} - A_{cbe})}, \text{ and} \quad (60)$$

$$C = \frac{\lambda_{df}}{L_{de} \cdot L_{ef} \cdot \sin(\pi - A_{deb} - A_{fei} - \theta_{bei})}. \quad (61)$$

The $r_{pq}$ terms must now be converted from terms of angular velocity to terms of linear velocity. This is done by multiplying $r_{31}$, $r_{32}$, and $r_{33}$ by $c_3$, where $$s_3 = \frac{-L_{gh} \cdot L_{hj} \cdot \sin(2\pi - A_{chg} - A_{ehi} - \theta_{jhi})}{\lambda_{gj}} \quad (62)$$

In the linear control mode, the first, second and third lever command signals are indicative of desired movement along an X axis 404, a Y axis 412 and desired hydraulic flow to the bucket cylinder. The terms of equations (56)–(58) are determined by:

$r_{11} = D$,
$r_{12} = E$,
$r_{13} = 0$,
$r_{21} = F$,
$r_{22} = G$,
$r_{23} = 0$,
$r_{31} = 0$,
$r_{32} = 0$, and
$r_{33} = 1$.

$$D = \frac{x \cdot [(\cos(\theta_{ebi})/\lambda_{bi}) - (1/L_{bc})]}{\lambda_{bi} \cdot \sin\theta_{ebi}} - y/\lambda bi^2; \quad (63)$$

$$E = \frac{y \cdot [(\cos(\theta_{ebi})/\lambda_{bi}) - (1/L_{bc})]}{\lambda_{bi} \cdot \sin\theta_{ebi}} - x/\lambda_{bi}^2; \quad (64)$$

$$F = \frac{x}{L_{bc} \cdot L_{ei} \cdot \sin(\theta_{bei} + \pi)}; \quad (65)$$

$$G = \frac{y}{L_{bc} \cdot L_{ei} \cdot \sin(\theta_{bei} + \pi)}; \text{ and} \quad (66)$$

$$s_1 = L_{bc} \cdot L_{bl} \cdot \sin(A_{abl} + A_{cbe} + \theta_{abe})/\lambda_{cl}; \quad (67)$$

$$s_2 = \frac{L_{de} \cdot L_{ef} \cdot \sin(\pi - A_{deb} + A_{fei} + \theta_{bei})}{\lambda_{cl}}. \quad (68)$$

The term $s_3$ is used as defined in Equation (62).

In the linear control mode with bucket attitude control mode, the first and second lever command signals are indicative desired movement along the X and Y axis 404,412. The bucket is adjusted to maintain a constant bucket angle. Adjustment of the bucket angle may be provided through the third control lever command signal. The terms of equations (56)–(58) are determined by:

$r_{11} = D$,
$r_{12} = E$,
$r_{13} = 0$,
$r_{21} = F$,
$r_{22} = G$,
$r_{23} = 0$,
$r_{31} = A$,
$r_{32} = A \cdot B$, and
$r_{33} = A \cdot C$, where A,B,C,D,E,F,G,$S_1$, $S_2$, and $S_3$ are determined using equations (59), (60), (61), (63), (64), (65), (66), (67), (68), and (62), respectively.

In the slope control mode, the terms are similar to those used in the linear control mode, but are adjusted to account for the desired slope angle F. The terms are therefore determined by:

$r_{11} = H$,
$r_{12} = I$,
$r_{13} = 0$,
$r_{21} = J$,
$r_{22} = K$,
$r_{23} = 0$,
$r_{31} = 0$,
$r_{32} = 0$, and
$r_{33} = 1$,
where $$H = \frac{x \cdot \cos(\Gamma) \cdot [(\cos(\theta_{ebi})/\lambda_{bi}) - (1/L_{bc})]}{\lambda_{bi} \cdot \sin\theta_{ebi}} + y/\lambda bi2;$$

$$I = \frac{y \cdot \sin(\Gamma) \cdot [(\cos(\theta_{ebi})/\lambda_{bi}) - (1/L_{bc})]}{\lambda_{bi} \cdot \sin\theta_{ebi}} - x/\lambda_{bi}^2;$$

$$J = \frac{x \cdot \sin(\Gamma)}{L_{be} \cdot L_{ei} \cdot \sin(\theta_{bei} + \pi)}; \text{ and}$$

$$K = \frac{y \cdot \sin(\Gamma)}{L_{bc} \cdot L_{ei} \cdot \sin(\theta_{bei} + \pi)};$$

and where $s_1$, $s_2$, and $s_3$ are determined by Equations (67),(68), and (62), respectfully.

In the slope control mode with bucket attitude control mode, the terms are similar to those used in the slope control mode, but the bucket angle is maintained at a constant angle. The terms are therefore determined by:

$r_{11} = H$,
$r_{12} = I$,
$r_{13} = O$,
$r_{21} = J$,
$r_{22} = K$,
$r_{23} = O$,
$r_{31} = A$,
$r_{32} = A \cdot B$, and
$r_{33} = A \cdot C$.

Industrial Applicability

With reference to the drawings, and in operation, the present invention is adapted to provide a coordinated control for a work vehicle's work implement. In the excavator, as discussed above, a manual control mode is provided. An operator using the control levers 130,132 operates the work implement 102 to perform the digging operations typical in the vehicle's work cycle, in a normal manner.

However, in order to automatically "finish" or provide a smooth surface using the bucket 108, one of the additional modes of the control system 100 is used. For example, to provide a level floor, the operator manually positions the bucket 108 at a point on the desired path. The control system 100 is transferred to the linear control mode. In the linear control mode, linear horizontal movement of the bucket pin (point i) is controlled by movement of the first control lever 130 along the first control axis 1316. Therefore, the operator need only pull back on the first control lever 130 and the control system 100 coordinates flow of hydraulic fluid to the cylinders 112,114,116 to provide the linear movement. Linear vertical movement is provided by movement of the first joystick along a second control axis 138. Alternatively, vertical movement may be controlled by a second control lever 132.

In the slope finish control modes, the operator must also signal the control system 100 as to the desired slope angle. In the preferred embodiment, the operator simply dials in the desired slope angle on the thumb wheel switch 146.

In an alternate embodiment, the operator first positions the bucket 108 at a first point on the desired slope and signals the control system 100. Then the operator positions the bucket 108 at a second point on the desired slope and signals the control system (100). The control system then calculates the desired slope based on the bucket positions.

In the bucket attitude control modes (linear and slope), the operator positions the bucket at the desired bucket attitude angle prior to engaging the linear or slope control mode.

We claim:

1. An apparatus for controllably moving a vehicle's work implement having a first appendage pivotally connected to the vehicle, and a second appendage having first and second end points and being pivotally connected to the first appendage at the first end point, comprising:

means for sensing the geometry of the work implement and responsively producing a plurality of position signals;

means for producing one of a manual control mode signal and an automatic control mode signal;

operator interface means for producing first and second lever command signals indicative of desired movement of the work implement;

logic means for receiving said one control mode signal and said first and second lever control signals, responsively producing linear motion of the second end point of the second appendage along first and second work axes in response to said one control mode signal being equal to said automatic control mode signal, and responsively producing angular motion of said first and second appendages in proportion to said first and second lever command signals, respectively, in response to said one control signal being equal to said manual control mode signal, said logic means including:

means for receiving said position signals; responsively calculating a plurality of mode value signals, wherein said mode value signals are in terms of angular velocities of the work implement in response to said one control mode signal being equal to the automatic control mode signal;

means for responsively calculating a plurality of angular-to-linear value signal, wherein said angular-to-linear value signals are in terms of linear velocity over angular velocity in response to said one control mode signal being equal to the automatic control mode signal; and means for calculating a plurality of transformation signals as a function of said angular-to-linear value and mode value signals; and for calculating a plurality of cylinder velocity command signals as a function of said mode value signals and said angular-to-linear value signals; and, actuating means for receiving said cylinder velocity command signals and responsively actuating the work implement.

2. An apparatus, as set forth in claim 1, wherein said first and second lever command signals being indicative of desired movement along an X axis and a Y axis respectively, in response to said one control mode being equal to said automatic control mode signal, wherein said X and Y axes are perpendicular.

3. An apparatus, as set forth in claim 1, including a third appendage pivotally connected to the second end point of the second appendage, said third appendage having an angular relationship with a horizontal plane, and wherein:

said operator interface means include means for producing a third lever command signal and said control mode signal producing means includes means for producing an automatic control with bucket attitude control mode signal.

4. An apparatus, as set forth in claim 3, including means for producing a slope angle signal indicative of a desired slope angle and wherein:

said third lever command signal being indicative of a desired angular velocity of said third appendage in response to said one control mode signal being equal to the manual control mode signal; and said first and second lever command signals being indicative of desired movement along an X axis and a Y axis, respectively, and said third lever command signal being indicative of a desired angular velocity of said third appendage in response to said one control mode signal being equal to said automatic control mode signal, said X and Y axes being perpendicular.

5. An apparatus, as set forth in claim 3, including means for producing a slope angle signal indicative of a desired slope angle and wherein:

said control mode signal producing means includes means for producing a slope finish control mode signal and a slope finish with bucket attitude control mode signal;

said first and second lever command signals being indicative of desired movement along an X axis and a Y axis, respectively, in response to said one control mode signal being equal to said automatic control with bucket attitude mode signal, said X and Y axes being perpendicular and said logic means being adapted to maintain said angular relationship;

said first and second lever command signals being indicative of desired movement along an X' axis and a Y' axis, respectively, and said third lever command signal being indicative of a desired angular velocity of said third appendage in response to said one control mode signal being equal to said slope finish control mode signal, said X' and Y' axes being perpendicular, said X' axis having a angular relationship with said horizontal plane proportional to said slope angle signal; and said first and second lever command signals being indicative of desired movement along an X' axis and a Y' axis, respectively, in response to said one control mode signal being equal to said slope finish with bucket attitude control mode signal, said X' and Y' axes being perpendicular, said X' axis having an angular relationship with said horizontal plane proportional to said slope angle signal and said logic means being adapted to maintain said angular relationship.

6. An apparatus, as set forth in claim 3, including means for producing a slope angle signal indicative of a desired slope angle and wherein:

said control mode signal producing means includes means for producing a slope finish control mode signal and a slope finish with bucket attitude control mode signal;

said first, second, and third lever command signals being indicative of desired angular velocities of the first, second and, third appendages, respectively, in response to said one control mode signal being equal to the manual control mode signal;

said first and second lever command signals being indicative of desired movement along an X axis and a Y axis, respectively, and said third lever command signal being indicative of a desired angular velocity of said third appendage in response to said one control mode signal being equal to said automatic control-mode signal, said X and Y axes being perpendicular;

said first and second lever command signals being indicative of desired movement along an X axis and a Y axis, respectively, in response to said one control mode signal being equal to said automatic control with bucket attitude control mode signal, said X and Y axes being perpendicular and said logic means being adapted to maintain said angular relationship;

said first and second lever command signals being indicative of desired movement along an X' axis and a Y' axis, respectively, and said third lever command signal being indicative of a desired angular velocity of said third appendage in response to said one control mode signal being equal to said slope finish control mode signal, said X' and Y' axes being perpendicular, said X' axis having an angular relationship with said horizontal plane proportional to said slope angle signal; and said first and second lever command signals being indicative of desired movement along an X' axis and a Y' axis, respectively, in response to said one control mode signal being equal to said slope finish with bucket attitude control mode signal, said X' and Y' axes being perpendicular, said X' axis having an angular relationship with said horizontal plane proportional to said slope angle signal and said logic means being adapted to maintain said angular relationship.

7. A method for controllably moving a vehicle's work implement having a first appendage pivotally connected to the vehicle, and a second appendage having first and second end points and being pivotally connected to the first appendage at the first end point, including the steps of:

sensing the geometry of said work implement and responsively producing a plurality of position signals;

sensing movement of first and second control levers and responsively producing first and second lever command signals;

producing a control signal in response to receiving one of a manual control mode signal and an automatic control mode signal;

receiving said control mode signal and said first and second lever command signals;

responsively producing linear motion of the second end point of the second appendage along first and second work axes in response said control signal being equal to said automatic control mode signal;

responsively producing angular motion of said first and second appendages in proportion to said first and second lever command signals, respectively, in response to said control signal being equal to said manual control mode signal; wherein said motion producing steps include the steps of:

calculating a mode value signal corresponding to each transformation signal as a function of said mode signal, said first and second lever command signals, and said position signals, wherein said mode value signals are in terms of angular velocities of the work implement in response to the mode signal being equal to the automatic control mode signal, calculating an angular-to-linear value signal corresponding to each transformation signal as a function of said mode signal, said first and second lever command signals, and said position signals, wherein said angular-to-linear value signals are in terms of linear velocity over angular velocity in response to the mode signal being equal to the automatic control mode signal, and calculating a plurality of transformation signals as a function of said angular-to-linear value and mode value signals.

* * * * *